J. Stitt,
Elastic Coupling.
No. 105,510.  Patented July. 19. 1870.
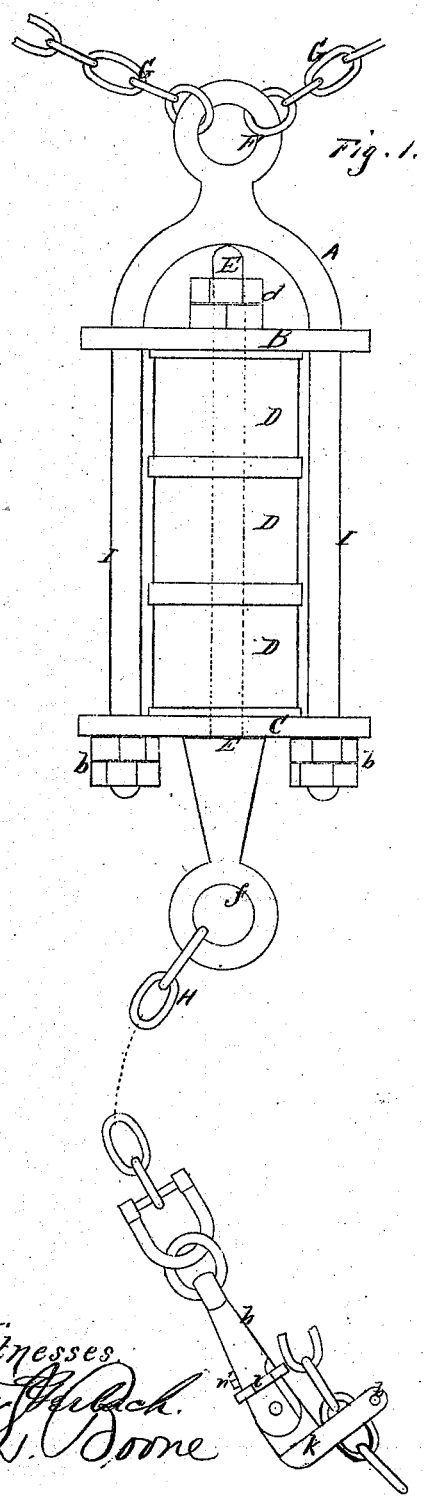
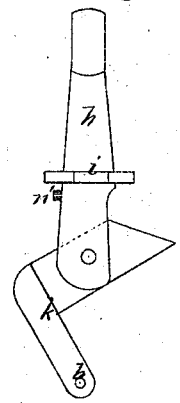
Fig. 1.
Fig. 2.
Witnesses  Inventor.

United States Patent Office.

JAMES STITT, OF SAN FRANCISCO, CALIFORNIA.

Letters Patent No. 105,510, dated July 19, 1870.

IMPROVEMENT IN CABLE-STOPPERS.

The Schedule referred to in these Letters Patent and making part of the same.

*To all whom it may concern:*

Be it known that I, JAMES STITT, of the city and county of San Francisco, State of California, have invented an Improved Riding Stopper for Anchors; and I do hereby declare the following description and accompanying drawing are sufficient to enable any person skilled in the art or science to which it most nearly appertains, to make and use my said invention or improvements without further invention or experiment.

The nature or essence of my invention consists in the combination and arrangement of the parts of a clutch or devil's claw for holding the cable of a vessel riding at anchor, a particular description of said device being given below.

In order to more fully illustrate and explain my invention, reference is had to the accompanying drawing forming a part of this specification, in which—

A represents a strong metal bar or rod, which may be bent to a U-shape, so as to bring the two ends parallel, as shown at I I; or it can be bent at right angles, as most convenient.

A cross-head, B, is provided with holes at each end, sufficiently large to allow the opposite arms I of the bar A to pass through them, and slide up and down upon them.

A second cross-head, C, similar to B, is also arranged so as to move upon these arms.

A block or series of blocks, D, which may be made of India rubber or other elastic material, is placed between these cross-heads.

The lower cross-head is secured in place by nuts, $b$, on the end of each of the arms I, which prevent it from slipping off the arms when it receives the strain.

A rod or bar, E, passes through a hole in the middle of each of the cross-bars and the elastic blocks, and is secured by nuts, $d$, at the end above the cross-bar B, so that, when the rod is drawn outward, the blocks of elastic material will be compressed, the cross-head C sliding upon the parallel arms.

A suitable ring or link, F, is strongly secured to the middle of the bar A, in a line with the rod E, to which a chain or chains, or cable, G, are firmly secured.

The lower end of the bar or rod E is formed into a strong ring, $f$, to which a strong chain, H, is secured.

To the opposite end of this chain is fixed a short iron bar, $h$, which is slotted at its end, in which end is pivoted, near its middle, one end of a rectangular piece of metal, $k$, the projecting arm of which is slotted, forming what is known as a devil's claw.

The pivoted arm of this bar fits into the slot in the end of the bar $h$, both the slot and arm being beveled at the bearing-point, and a ring, $i$, is arranged to slide along the bar $h$, so as to bind the arm firmly in the slot.

The ring $i$ is made polygonal, so as to be turned by a wrench, in order to bring the small slot $n$ in position to unlock over the projection $n'$ when it is desired to release the anchor's cable.

In operation, the anchor having been let go, two or three turns of the anchor's cable is retained around the windlass. The chains G are then secured around the windlass, and one of the links of the anchor's chain is placed in the slot or devil's claw, and a pin, $l$, inserted to keep it in place, after which the cable is slackened between the windlass and the devil's claw, thus bringing all the strain upon the stopper. In this position the ship can ride at ease, and, when it is desired to release the anchor, the pin $l$ is first removed, and the ring $i$ slipped away from the opposite arm of the devil's claw, when the rectangular bar will immediately turn, so as to release the chain.

Having thus described my invention,

What I claim, and desire to secure by Letters Patent, is—

The combination of slotted bar $h$, provided with projection $n'$, bent and forked bar $k$, pivoted in $h$, and the ring $i$, provided with slot $n$, to pass the aforesaid projection, arranged to operate substantially as described.

In witness whereof I have hereunto set my hand and seal.

JAMES STITT. [L. S.]

Witnesses:
J. L. BOONE,
WM. GERLACH.